United States Patent [19]
Honkasalo et al.

[11] Patent Number: 5,898,925
[45] Date of Patent: *Apr. 27, 1999

[54] METHOD AND ARRANGEMENT FOR EFFECTING TRANSMISSION POWER CONTROL AND/OR HANDOVER OF A MOBILE STATION ASSIGNED TWO OR MORE TIME SLOTS PER FRAME IN A TDMA TELECOMMUNICATIONS SYSTEM

[75] Inventors: Zhi-Chun Honkasalo; Harri Honkasalo, both of Helsinki; Harri Jokinen, Hiisi; Harri Posti, Oulu, all of Finland

[73] Assignees: Nokia Telecommunications Oy, Espoo; Nokia Mobile Phones Ltd., Salo, both of Finland

[*] Notice: This patent issued on a continued prosecution application filed under 37 CFR 1.53(d), and is subject to the twenty year patent term provisions of 35 U.S.C. 154(a)(2).

[21] Appl. No.: 08/591,557
[22] PCT Filed: May 10, 1995
[86] PCT No.: PCT/FI95/00249
  § 371 Date: Apr. 4, 1996
  § 102(e) Date: Apr. 4, 1996
[87] PCT Pub. No.: WO95/31879
  PCT Pub. Date: Nov. 23, 1995

[30] Foreign Application Priority Data
May 11, 1994 [FI] Finland ..................................... 942191

[51] Int. Cl.⁶ ..................................................... H04Q 7/20
[52] U.S. Cl. .......................... 455/437; 455/450; 455/522; 455/69; 455/67.1; 370/337; 370/347
[58] Field of Search .................................... 455/33.1, 33.2, 455/54.1, 54.2, 56.1, 68, 69, 67.1, 67.7, 38.1, 403, 422, 434, 436, 437, 438, 450, 451, 452, 455, 509, 511, 517, 522; 370/337, 347, 468; 379/59, 60, 63

[56] References Cited

U.S. PATENT DOCUMENTS

| | | | |
|---|---|---|---|
| 4,763,322 | 8/1988 | Eizenhofer | 370/468 X |
| 4,972,506 | 11/1990 | Uddenfeldt | 455/54.1 X |
| 5,199,031 | 3/1993 | Dahlin | 455/54.1 X |
| 5,404,355 | 4/1995 | Raith | 455/38.1 |
| 5,579,373 | 11/1996 | Jang | 455/33.2 X |

FOREIGN PATENT DOCUMENTS

| | | |
|---|---|---|
| 332818 | 9/1989 | European Pat. Off. . |
| 615 353 | 9/1994 | European Pat. Off. . |
| 671 824 | 9/1995 | European Pat. Off. . |

OTHER PUBLICATIONS

Hamalainen, et al: "Packet Data Over GSM Network", ETSI TDOC smal 238/93.

Primary Examiner—Wellington Chin
Assistant Examiner—Philip J. Sobutka
Attorney, Agent, or Firm—Pillsbury Madison & Sutro LLP

[57] ABSTRACT

A method and an arrangement for controlling transmitting power of a mobile station and carrying out a handover in a mobile telecommunications system in which data is transmitted over the radio path between a mobile station and a base station as bursts in time slots of successive frames. A mobile station can be allocated at least two time slots in each frame for high-speed data transmission. The mobile station is arranged to measure the characteristics of the received signal, such as the signal level and/or quality, in each time slot allocated to the mobile station, and the fixed radio network is arranged to control the transmitting power of the mobile station and/or make the decision on a handover on the basis of a combination of measurement results of two or more time slots, or on the basis of the measurement result of the poorest time slot.

13 Claims, 4 Drawing Sheets

FIG. 2
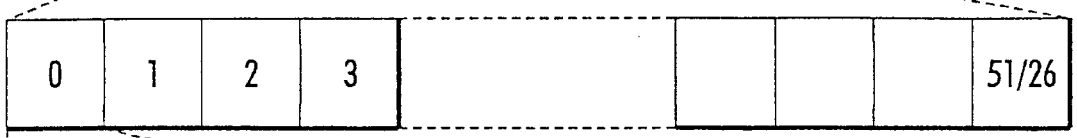
FIG. 3
FIG. 4
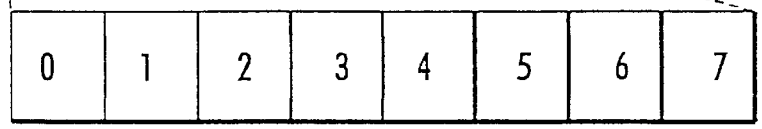
FIG. 5
TCH/F - MULTIFRAME
| TCH | TCH | TCH | TCH | TCH | TCH | TCH | TCH | TCH | TCH | TCH | TCH | SACCH | TCH | TCH | TCH | TCH | TCH | TCH | TCH | TCH | TCH | TCH | TCH | TCH | IDLE |
|---|---|---|---|---|---|---|---|---|---|---|---|---|---|---|---|---|---|---|---|---|---|---|---|---|---|
0...                                                                              ...25
FIG. 6

METHOD AND ARRANGEMENT FOR EFFECTING TRANSMISSION POWER CONTROL AND/OR HANDOVER OF A MOBILE STATION ASSIGNED TWO OR MORE TIME SLOTS PER FRAME IN A TDMA TELECOMMUNICATIONS SYSTEM

FIELD OF THE INVENTION

The present invention relates to methods and an arrangement for power control of a mobile station, and performing a handover in a mobile telecommunications system in which data is transmitted over the radio path between a mobile station and a base station of a fixed radio network as bursts in time slots of successive frames.

BACKGROUND OF THE INVENTION

In mobile telecommunications systems of the time division multiple access (TDMA) type, time division communication in the radio path takes place in successive TDMA frames each of which consists of several time slots. In each time slot, a short information packet is sent as a radio frequency burst of a finite duration, which burst consists of a number of modulated bits. For the most part, time slots are used for the transmission of control channels and traffic channels. On the traffic channels, speech and data are transmitted. On the control channels, signalling between a base station and mobile subscriber stations is carried out. The Pan-European mobile system GSM (Global System for Mobile Communications) is an example of a TDMA radio system.

For communication in conventional TDMA systems, each mobile station is assigned one time slot of traffic channel for data or speech transmission. Thus, a GSM system, for example, can have as many as eight simultaneous connections to different mobile stations on a same carrier frequency. The maximum data transfer rate on a traffic channel is restricted to a relatively low level according to the bandwidth in use as well as channel coding and error correction, for example in a GSM system to 9.6 kbit/s or 12 kbit/s. In addition, in a GSM system a half-speed traffic channel (max. 4.8 kbit/s) can be chosen for low speeds of speech coding. The half-speed traffic channel is established when a mobile station communicates in a specific time slot only in every second frame, in other words, in half-speed. A second mobile station communicates in every second frame in the same time slot. This is how the capacity of the system can be doubled as far as the number of subscribers is concerned, in other words, on the same carrier wave it is possible for up to 16 mobile stations to communicate simultaneously.

In the last few years, the need for high-speed data services in mobile communication networks has remarkably increased. Data transfer rates of at least 64 kbit/s would be needed to utilize, for example, ISDN (Integrated Services Digital Network) circuit switched digital data services. PSTN data services of the public telephone network, such as modems and telefax terminals of class G3, require faster transfer rates, such as 14.4 kbit/s. One of the growing areas of mobile data transfer requiring higher transfer rates is the mobile video service. As examples of this kind of services, security control by cameras and video databases can be mentioned. The minimum data transfer rate in video transfer can be, for example, 16 or 32 kbit/s.

The data transfer rates of the present mobile communication networks are not, however, sufficient to satisfy this kind of new needs.

SUMMARY OF THE INVENTION

It is an object of the present invention to enable higher data transfer rates in mobile communication networks.

Another object of the invention is a handover and power control of a mobile station in connection with high-speed data transmission.

This object is achieved by a method for power control of a mobile station in a mobile telecommunications system which method comprises transmitting data over the radio path between a mobile station and a base station of a fixed radio network as bursts in time slots of successive frames, and allocating the mobile station at least two time slots in each frame for high-speed data transmission, which method comprises measuring the characteristics of the received signal, such as signal level and/or quality, at the mobile station in each time slot allocated to the mobile station, controlling the transmitting power of a mobile station on the basis of a combination of measurement results of two or more time slots, or on the basis of a measurement result of the poorest time slot.

The invention also relates to a handover method in a mobile telecommunications system which method comprises transmitting data over the radio path between a mobile station and a base station of a fixed radio network as bursts in time slots of successive frames, and allocating the mobile station at least two time slots in each frame for high-speed data transmission, which method comprises measuring the characteristics of the received signal, such as signal level and/or quality, at the mobile station in each time slot allocated to the mobile station, making a handover decision on the basis of a combination of measurement results of two or more time slots, or on the basis of a measurement result of the poorest time slot.

The invention also relates to a control arrangement of a mobile station in a mobile telecommunications system in which data is transmitted over the radio path between a mobile station and a base station of a fixed radio network as bursts in time slots of successive frames, and a mobile station can be allocated at least two time slots in each frame for high-speed data transmission, which arrangement comprises that a mobile station is arranged to measure the characteristics of the received signal, such as signal level and/or quality, in each time slot allocated to the mobile station, and that the fixed radio network is arranged to control the transmitting power of a mobile station and/or make a handover decision on the basis of a combination of measurement results of two or more time slots, or on the basis of a measurement result of the poorest time slot.

The invention employs a so-called multi-slot technique so that a mobile station has access to two or more time slots in each frame. The high-speed data signal to be transmitted over the radio path is split into a required number of data signals of lower speed, each signal being transmitted as bursts in a respective time slot. As soon as the data signals of lower speed have separately been transmitted over the radio path, they are again at the receiving end combined into the original high-speed signal. This is how the data transfer rate can be doubled, tripled, etc., depending on whether two, three or more time slots are assigned to be used by a subscriber. In a GSM system, for example, two time slots will enable a data transfer speed of 2×9.6 kbit/s which is enough for a modem of 14.4 kbit/s, or a telefax terminal, for example. Six time slots will enable a data transfer rate of 64 kbit/s.

The multi-slot technique in accordance with the invention, in which a high-speed data signal is transmitted as several bursts in several time slots within one frame, has many advantages over an alternative approach in which a mobile station is also assigned several time slots in the same frame for data transmission, but the whole data signal is transmitted as one burst extended for the time of the assigned time slots. In the present invention, there is no need to change the other significant characteristics of the physical transmission path (radio path, for example, Layer 1 of GSM), such as frequency division, frame format and time slot configuration, data transfer rate, error correction, modulation, format of a TDMA burst, bit error ratio (BER), etc. In other words, by the present invention it is possible to support different kind of subscriber data transfer rates in the radio system by a single structure of a physical transmission path. Consequently there is no need to support several structures of a physical transmission path by the subscriber terminals, either.

The multi-slot technique of the invention enables that each time slot, i.e. traffic channel, allocated to a mobile station can be handled as an independent traffic channel with regard to measurements, transmitting of measurement reports, and power control. Each traffic channel is measured independently. In the primary embodiment of the invention, it is possible to carry out the power control and the reporting of measurement results independently for each time slot by associating an individual, parallel control channel with each traffic channel time slot. This is advantageous, because the signal quality can vary considerably in different time slots due to, for example, different interference conditions. By the split power control, a more optimal multi-slot system can be obtained with regard to power used and the quality of the received signal. An optimized use of transmitting power means a lower average transmitting power, which leads to a longer battery life. The average interference level in the system is also decreased resulting in a higher system capacity.

In a second embodiment of the invention, all the time slots have their own control channels through which measurement reports are transmitted, but power control is performed for each channel through only one single control channel in the direction from the fixed network to a mobile station.

Similar kinds of improvements in the performance of the system, albeit of less importance, are obtained by using a common, parallel control channel for all time slots assigned to a mobile station so that a combination of measurement results of all the time slots, for example, average value, is transmitted to the fixed radio network over the common control channel. The fixed radio network controls the transmitting power of the mobile station through the same common control channel.

The reliability of handover decisions can also be improved in a multi-slot system in cases wherein every time slot assigned to a mobile station is independently measured in accordance with the invention, and the handover decision is made on the basis of a combination of the measurement results, such as average value, or on the basis of the poorest time slot.

The implementation may be especially simple if adjacent time slots are employed. Consequently, it will be easier to carry out various measurements the remaining part of the frame, and increasing the number of frequency synthesizers in the receiver of the mobile station is avoided. In the GSM system, it is especially advantageous to implement the invention by two time slots.

BRIEF DESCRIPTION OF THE DRAWINGS

In the following, the invention will be described in greater detail by the primary embodiments with reference to the accompanying drawings, in which:

FIGS. 2, 3, 4 and 5 illustrate a TDMA frame format, FIG. 6 illustrates a TCH/F+SACCH multiframe.

DETAILED DESCRIPTION OF THE PREFERRED EMBODIMENTS OF THE INVENTION

The present invention can be applied to high-speed data transmission in most of the digital mobile systems of the TDMA type such as, for example, the Pan-European digital mobile system GSM, DSC1800 (Digital Communication System), UMTS (Universal Mobile Telecommunication System), FPLMTS (Future Public Land Mobile Telecommunication System), etc.

Figure 1:
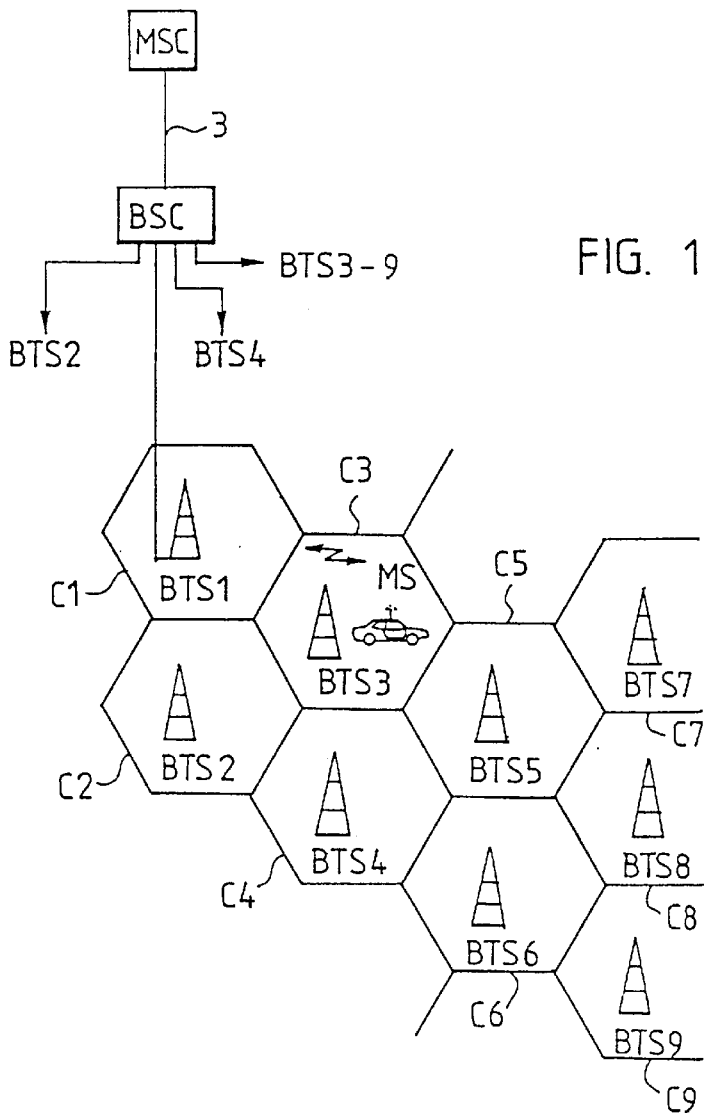
FIG. 1 illustrates a section of a mobile system in which the invention can be applied.

A mobile system of the GSM type is illustrated as an example. GSM (Global System for Mobile Communications) is a Pan-European mobile system. FIG. 1 very briefly illustrates the basic elements of the GSM system without going any further into the details or other subsections of the system. For a closer description of the GSM system, the GSM recommendations and "The GSM System for Mobile Communications", by M. Mouly & M. Pautet, Palaiseau, France, 1992, ISBN: 2-9507190-0-7 is referred to.

A mobile services switching centre MSC handles the connecting of incoming and outgoing calls. It performs functions similar to those of an exchange of a public telephone network (PSTN). In addition to these, it also performs functions characteristic of mobile communications only, such as subscriber location management in co-operation with the subscriber registers of the network. As subscriber registers, the GSM system at least includes the home location register HLR and the visitor location register VLR which are not shown in FIG. 1. More accurate information of the location of the subscriber, usually the accuracy of the location area, is stored in the visitor location register, there being typically one VLR per each mobile services switching centre MSC, while the HLR knows which VLR area the mobile station MS is visiting. The mobile stations MS are connected to the centre MSC by base station systems. The base station system consists of a base station controller BSC and base stations BTS. One base station controller is used to control several base stations BTS. The tasks of the BSC include, among other things, handovers in cases in which the handover is performed within the base station, or between two base stations controlled by the same BSC. FIG. 1 only shows, for reasons of clarity, a base station system in which nine base stations BTS1–BTS9 are connected to a base station controller BSC, the radio coverage area of which base stations forms the corresponding radio cells C1–C9.

The GSM system is a time division multiple access (TDMA) system in which the time division traffic on the radio path takes place in successive TDMA frames each of which consists of several time slots. In each time slot, a short information packet is sent as a radio frequency burst of a finite duration, which burst consists of a number of modulated bits. For the most part, time slots are used for the transmission of control channels and traffic channels. On the traffic channels, speech and data are transmitted. On the control channels, signalling between a base station and mobile subscriber stations is carried out.

Channel structures used in radio interfaces of the GSM system are described in closer detail in the ETSI/GSM recommendation 05.02. The TDMA frame format of the GSM system is illustrated as an example in FIGS. 2–5. FIG. 5 illustrates a TDMA basic frame which includes eight time slots 0–7 used as traffic channels or control channels. Thus, only one radio frequency burst shorter than the duration of the time slot is transmitted in each time slot. As soon as one TDMA basic frame ends in time slot 7, the time slot 0 of the next basic frame immediately begins. Thus, 26 or 51 successive TDMA frames form a multiframe depending on whether a traffic channel or a control channel structure is in question, as illustrated in FIG. 4. A superframe consists of 51 or 26 successive multiframes depending on whether the multiframes have 26 or 51 frames, as illustrated in FIG. 3. A hyperframe is formed of 2048 superframes, as illustrated in FIG. 2. The hyperframe is the largest successive frame unit, whose ending starts a new, similar hyperframe.

Figure 7:
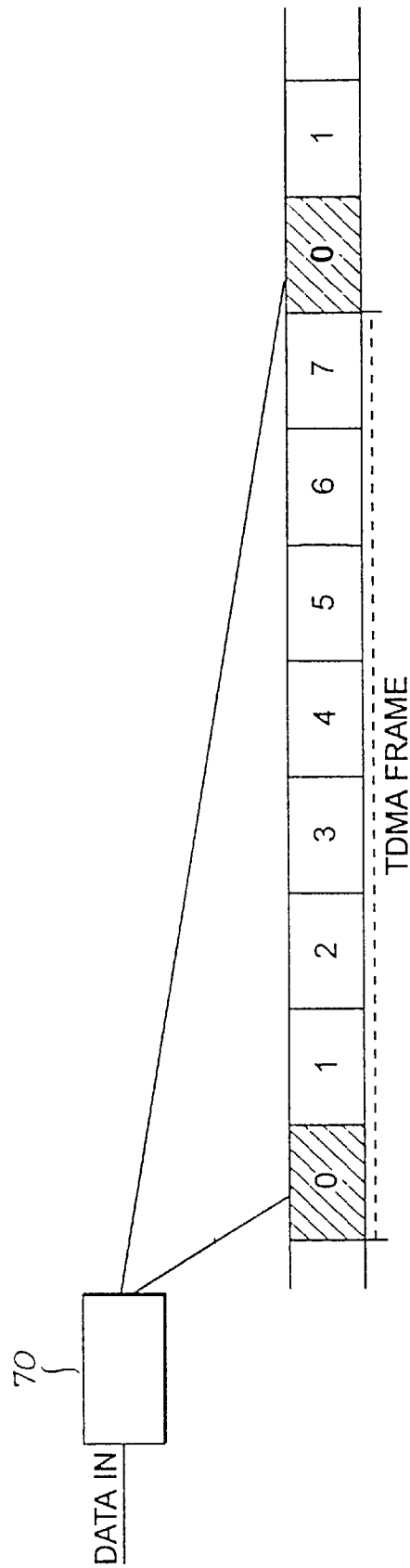
FIG. 7 illustrates a conventional data transmission in one time slot.

FIG. 6 illustrates a structure of a full-speed traffic channel TCH/F-SACCH/TF defined by the aforemention recommendation, in which structure a multiframe includes 24 full-speed traffic channel frames TCH, one parallel control channel frame SACCH and a dummy frame IDLE. In each time slot assigned to be used as traffic channels, the control channel SACCH and a dummy time slot are repeated every 26 time slots. The positions of the frames SACCH and IDLE are different for time slots 0, 2, 4 and 6 than for time slots 1, 3, 5, and 7. What is illustrated in FIG. 7 is valid for time slots 0, 2, 4 and 6. In time slots 1, 3, 5 and 7, frames IDLE and SACCH exchange places. The control channel SACCH is used for reporting the measurement results from the mobile station to the fixed radio network, and for controlling the mobile station, for example, providing power adjustment, from the fixed radio network.

In normal operation, at the beginning of a call a mobile station MS is assigned one time slot from a carrier wave as a traffic channel (single slot access). The mobile station MS synchronizes into this time slot to transmit and receive radio frequency bursts. In FIG. 7, for example, a mobile station MS is locked to the time slot 0 of a frame. Channel coding, interleaving, burst formation, and modulation 70 are carried out to the data to be transmitted DATAIN, after which operations the radio frequency burst is transmitted in the time slot 0 of each TDMA frame. In the remaining part of the frame, the MS carries out various kinds of measurements, as will be described below.

In accordance with the invention, a mobile station MS requiring data transmission of higher speed than one traffic channel can offer, is assigned two or more time slots from the same frame.

The multi-slot technique according to the invention requires certain additional features in the signalling in connection with traffic channel allocation. During the call set-up time, assigning a traffic channel to a mobile station is carried out by an assignment command which is transmitted to the mobile station by the fixed network. This message must contain the data of all the traffic channels that are assigned to a mobile station MS for high-speed data transmission according to the invention. Already by now, the GSM system must be able to address two half-speed traffic channels in the same assignment command, which is why the message contains descriptions and modes for both the first as well as the second traffic channel. The present assignment command can easily be expanded to cover the addressing of at least two time slots, i.e. full-speed traffic channels. An assignment command is described in the GSM recommendation 04.08, version 4.5.0, June 1993, pp. 168–170. Channel addressing in accordance with the invention can be performed in the assignment command data elements Mode of first channel, Mode of second channel, and Channel Description Information element, which are described in greater detail in the GSM recommendation 04.08, version 4.5.0, June 1993, pp. 316–350. For addressing more than two time slots, a new message must be determined. Due to the fact that all the channels addressed are of the same type of channel, TCH/F, the message can be limited to describe the type of the first channel and then the total number of channels required. In such a case, the message would be rather short and simple.

Correspondingly, in case of a handover, the handover command must be able to address two or more time slots in the same frame. In the GSM system, the handover command contains the same data fields as described above in connection with the assignment command, and thus it can be applied to the requirements of the invention with similar changes. The handover command is described in the GSM recommendation 04.08, version 4.5.0, June 1993, pp. 184–189.

A second alternative is to employ a dedicated assignment command for each time slot.

In both cases, both outgoing and incoming call set-up messages (SETUP) of a mobile station must contain information about the actual channel requirements, in other words, the number of time slots needed. This information may be included in the Bearer Capability Information element BCIE. The BCIE is described in the GSM recommendation 04.08, version 4.5.0, pp. 423–431.

Figure 8:
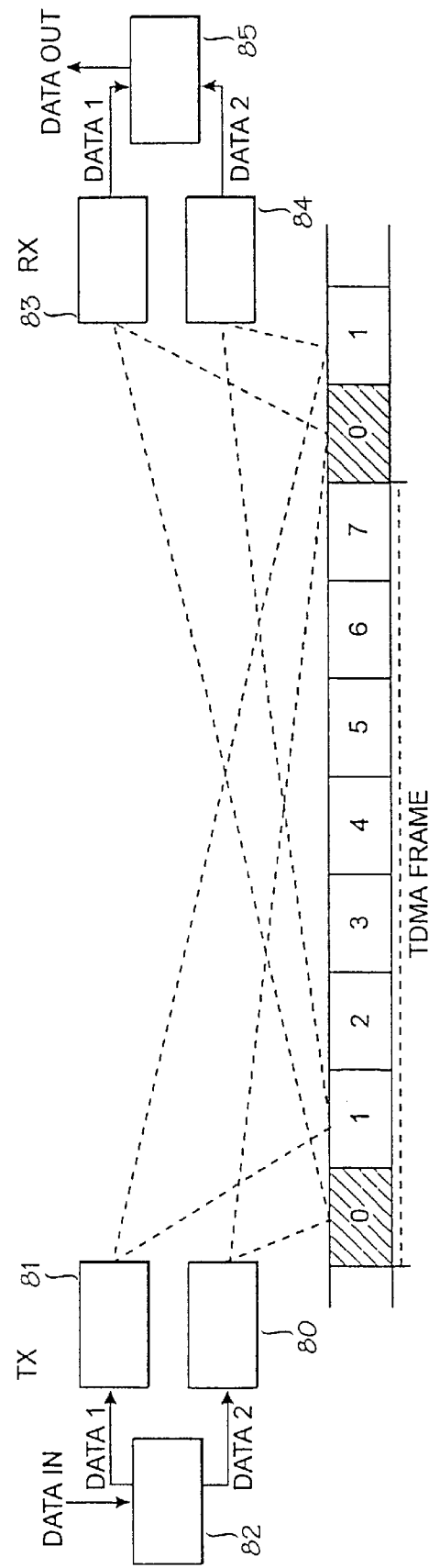
FIG. 8 illustrates data transmission in accordance with the invention in two time slots.

FIG. 8 shows an example in which a mobile station MS is assigned successive time slots 0 and 1 from the same TDMA frame. A high-speed data signal DATAIN to be transferred over the radio path is split in the divider 82 into a necessary number of data signals of lower speed DATA1 and DATA2. Channel coding, interleaving, burst formation and modulation 80, and, correspondingly, 81, are separately carried out to each data signal of lower speed DATA1 and DATA2, after which each data signal is transmitted as a radio frequency burst in its dedicated time slot 0 and 1, respectively. As soon as the lower speed data signals DATA1 and DATA2 are separately transmitted over the radio path, demodulation, deinterleaving and channel decoding 83 and, correspondingly, 84, of the signals are separately performed at the receiving end, after which the signals DATA1 and DATA2 are combined into the original high-speed signal DATAOUT in the combiner 85 at the receiving end.

On the fixed network side, the functions of blocks 80, 81, 83, 84 of FIG. 8, in other words, channel coding, interleaving, burst formation and modulation, and, correspondingly, demodulation, deinterleaving and channel decoding are located advantageously at the base station BTS. The base station BTS has a separate, parallel handling for each time slot. The divider 82 and the combiner 85 can, in turn, be assigned, as needed, to any network element such as a base station BTS, a base station controller BSC, or a mobile services switching centre MSC. In cases the divider 82 and the combiner 85 are located in another network element than the base station BTS, the data signals of lower speed DATA1 and DATA2 are transmitted between that element and the base station BTS similarly to signals on normal traffic channels.

In a fixed network of the GSM system, various functions relating to speech coding and rate adaptation are concentrated in a TRCU (Transcoder/Rate Adaptor Unit). The TRCU may be located in several alternative places in the system according to choices made by the manufacturer. Typically, the TRCU is placed at the mobile services switching centre MSC, but it may also be a part of a base station controller BSC or a base station BTS. In cases the TRCU is placed apart from a base station BTS, information is transmitted between the base station and the transcoder/rate adaptor unit TRCU in so-called TRAU frames. The function of the transcoder/rate adaptor unit is defined in the GSM recommendation 08.60. A combiner 85 and a divider 83 in accordance with the invention may be placed with this transcoder/rate adaptor unit TRCU.

In a mobile station MS, the blocks 80, 81, 83 and 84 of FIG. 8, in other words, channel coding, interleaving, burst formation and modulation, and, correspondingly, demodulation, deinterleaving and channel decoding, are advantageously implemented by a processing unit common to all time slots, at least in an embodiment of two time slots.

As is well known, mobile stations MS can freely roam in the area of a mobile system from one cell to another. If a mobile station is not handling a call, switching from one cell to another includes simply a registration to a new cell. If a mobile station MS is handling a call during the switching of cells, the call must also be switched from one base station to another by a way which causes as little disturbance to the call as possible. Switching cells during a call is called a handover. A handover can also be carried out within a cell from one traffic channel to another.

If a mobile station MS roams in a radio network, a handover from the serving cell to a neighbouring cell is normally performed either (1) as the measurement results of the mobile station MS and/or the base station BTS indicate a low signal level and/or quality from the current serving cell and a better signal level can be obtained from a neighbouring cell, or (2) as a neighbouring cell enables communication at lower transmitting power levels, in other words, as the mobile station MS is in a border area between cells. In radio networks, the aim is to avoid unnecessarily high power levels and thus interference elsewhere in the network.

Figure 9:
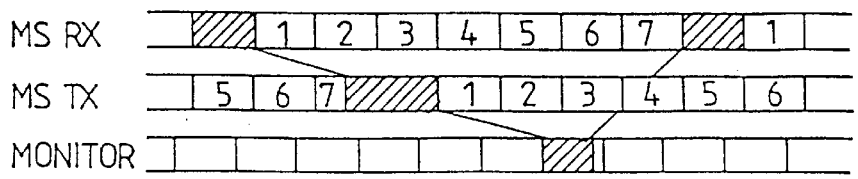
FIG. 9 illustrates the timing of transmission, reception and measurements in a data transmission of one time slot.

In FIG. 9, a mobile station is in a normal manner locked into a time slot 0 of a frame. In the time slot 0, the traffic channel TCH assigned to the mobile station is transmitted. In addition, in every 26th frame of the same time slot a parallel control channel SACCH is transmitted, as described in connection with FIG. 6. According to the GSM recommendations, a mobile station MS monitors (measures) the level and quality of the downlink signal of the serving cell in time slot 0 on the traffic channel TCH assigned to it. During the other time slots, the mobile station MS measures the levels of the downlink signals of the neighbouring cells of the serving cell. All the measurement results of the mobile station MS are regularly transmitted to a base station controller BSC through a parallel control channel SACCH associated with the time slot of traffic channel TCH. The base station BTS monitors (measures) the level and quality of the uplink signal received from each of the mobile stations MS served by the respective base station BTS.

On the basis of the measurement results, the BSC controls the power of the mobile station MS by power control commands transmitted to the MS in the downlink direction through the control channel SACCH, and makes the handover decisions.

Procedures and calculations used in radio networks for determining suitable transmitting power levels are referred to as power control algorithms. There are many different types of algorithms, but usually their aim is the lowest possible transmitting power level and, thus, low interference levels.

Decisions on handovers during on-going calls are made by a base station controller BSC on the basis of various handover parameters assigned to each cell, and on the basis of measurement results reported by a mobile station MS and base stations BTS. A handover is normally carried out on the basis of criteria of the radio path, but it can be performed due to other reasons as well, for example, load sharing. The procedures and calculations used as the basis of a handover decision are referred to as a handover algorithm. Alternatively, all handover decisions can be made at a mobile services switching centre MSC to which all the measurement results are in such a case transmitted. A MSC also controls at least those handovers occurring from the area of one base station controller to the area of another.

Figure 10:
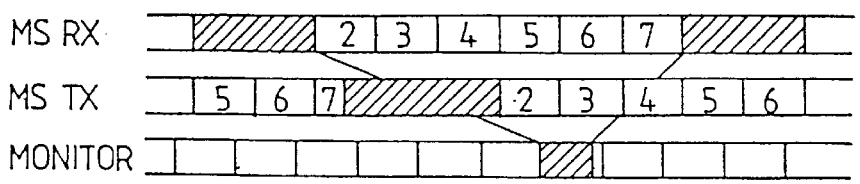
FIG. 10 illustrates the timing of transmission, reception and measurements in a data transmission of two time slots.

As a mobile station is, in accordance with the invention, assigned a plurality of time slots within the same frame for high-speed data transmission, the mobile station measures the level and quality of the downlink signal separately in each time slot assigned to it. In the example of FIG. 10, a mobile station is assigned the adjacent time slots 0 and 1. The mobile station MS measures the level and quality of the downlink signal of the serving cell independently in time slot 0 and 1 on the traffic channel TCH assigned to it. During the other time slots, the mobile station MS measures the levels of the downlink signals of the neighbouring cells of the serving cell.

In the primary embodiment of the present invention, each time slot assigned to a mobile station MS, the traffic channel TCH, has a dedicated parallel control channel SACCH through which the measurement results relating to the respective time slot are transmitted to a base station controller BSC.

A base station controller BSC controls the transmitting power of a mobile station MS separately in each time slot, in other words, on the traffic channel TCH, by power control commands transmitted to the mobile station MS in the downlink direction through the control channel SACCH of the traffic channel. Power control on an individual channel is otherwise carried out in accordance with the GSM recommendations.

Alternatively, a base station controller BSC may control the transmitting power levels of all the time slots by a common power control command transmitted to the mobile station MS in the downlink direction through one of the parallel control channels.

The handover decision is made by the base station controller on the basis of a combination of measurement results of two or more time slots assigned to a mobile station, or on the basis of a measurement result of the poorest time slot. As the decision to carry out a handover is made, a modified handover command is transmitted to the mobile station MS, as described above.

In a second embodiment of the present invention, all the time slots assigned to a mobile station MS, the traffic channels TCH, have a common, parallel control channel SACCH through which a combination of measurement results of the time slots is transmitted to a base station controller BSC. This combination of the measurement results can, for example, be the average value of the measurement results of the various time slots.

The base station controller BSC controls the transmitting power levels of the mobile station MS jointly in all the time slots, in other words, on the traffic channels TCH, by common power control commands transmitted to the mobile station MS in the downlink direction through the common control channel SACCH.

The handover decision is made by the base station controller on the basis of a combination of measurement results of either all or some of the time slots assigned to a mobile station MS. As the decision to carry out a handover is made, a modified handover command is transmitted to the mobile station as described above.

The drawing figures and the description referring to them are only intended to illustrate the present invention. The method and arrangement of the invention may vary in details within the scope of the attached claims.

We claim:

1. A method for power control of a mobile station in a mobile telecommunications system, the method comprising:

transmitting data over a radio path between a mobile station and a base station of a fixed radio network as bursts in time slots of successive frames;

allocating the mobile station at least two time slots in each frame for transmitting a high-speed data signal having a data rate which is higher than that supported by use of one time slot in each frame;

splitting the high-speed data signal into a plurality of lower-speed sub-signals corresponding in number to the number of allocated time slots;

the transmitting including transmitting the lower-speed sub-signals over the radio path as respective separate bursts in each of the allocated time slots;

upon reception of the separate bursts transmitted over the radio path, combining the lower-speed sub-signals, thereby restoring the high-speed data signal;

measuring, at the mobile station in each time slot allocated to the mobile station, at least one characteristic of a received signal, the characteristic selected from the group consisting of signal level and signal quality; and controlling the transmitting power of the mobile station on the basis of one of (a) a combination of measurement results of two or more time slots assigned to the mobile station, and (b) a measurement result of the poorest time slot in relation to the at least one characteristic.

2. A method as claimed in claim 1, further comprising:

assigning the mobile station a parallel control channel common to all the time slots assigned to the mobile station;

transmitting a combination of the measurement results of all the time slots assigned to the mobile station from the mobile station to the fixed radio network through the common, parallel control channel; and controlling the transmitting power of the mobile station in all the time slots assigned to the mobile station through the common, parallel control channel.

3. A method as claimed in claim 1, further comprising:

assigning the mobile station a dedicated parallel control channel for each time slot assigned to the mobile station;

transmitting the measurement result of each time slot assigned to the mobile station, separately, from the mobile station to the fixed radio network through the parallel control channel corresponding to each respective the time slot; and controlling the transmitting power of the mobile station in each time slot assigned to the mobile station through the control channel corresponding to the respective time slot.

4. A method as claimed in claim 1, further comprising:

assigning the mobile station a dedicated parallel control channel for each time slot assigned to the mobile station;

transmitting the measurement result of each time slot assigned to the mobile stations, separately, from the mobile station to the fixed radio network through the parallel control channel corresponding to each respective the time slot; and controlling the transmitting power of the mobile station in all the time slots assigned to the mobile station through one the common, parallel control channel.

5. A handover method in a mobile telecommunications system, the method comprising:

transmitting data over a radio path between a mobile station and a base station of a fixed radio network as bursts in time slots of successive frames;

allocating to the mobile station at least two time slots in each frame for transmitting a high-speed data signal having a data rate which is higher than that supported by use of one time slot in each frame;

splitting the high-speed data signal into a plurality of lower-speed sub-signals corresponding in number to the number of allocated time slots;

the transmitting including transmitting the lower-speed sub-signals over the radio path as respective separate bursts in each of the allocated time slots;

upon reception of the separate bursts transmitted over the radio path, combining the lower-speed sub-signals, thereby restoring the high-speed data signal;

measuring, at the mobile station in each time slot allocated to the mobile station, at least one characteristic of a received signal, the one characteristic selected from the group consisting of signal level and signal quality; and making a handover decision in regard to the mobile station on the basis of one of (a) a combination of measurement results of two or more time slots assigned to the mobile station, and (b) a measurement result of the poorest time slot in relation to the at least one characteristic.

6. A method as claimed in claim 5, further comprising:

assigning the mobile station a parallel control channel common to all the time slots assigned to the mobile station; and transmitting a combination of the measurement results of all the time slots assigned to the mobile station from the mobile station to the fixed radio network through the common, parallel control channel.

7. A method as claimed in claim 5, further comprising:

assigning the mobile station a dedicated parallel control channel for each time slot assigned to the mobile station; and transmitting the measurement result of each time slot assigned to the mobile station, separately, from the mobile station to the fixed radio network through the parallel control channel corresponding to each respective the time slot.

8. A control arrangement of a mobile station in a mobile telecommunications system in which data is transmitted over a radio path between the mobile station and a base station of a fixed radio network as bursts in time slots of successive frames, the arrangement comprising:

means for allocating the mobile station at least two time slots in each frame for transmitting a high-speed data signal having a data rate which is higher than that supported by use of one time slot in each frame;

means for splitting the high-speed data signal into a plurality of lower-speed sub-signals corresponding in number to the number of allocated time slots;

means for transmitting the lower-speed sub-signals over the radio path as respective separate bursts in each of allocated time slots;

means for combining the lower-speed sub-signals, upon reception of the separate bursts transmitted over the radio path, and thereby restoring the high-speed data signal;

the mobile station being arranged to measure at least one characteristic of a received signal, the characteristic selected from the group consisting of signal level and signal quality, in each time slot allocated to the mobile station; and the fixed radio network being arranged to at least one of (a) control the transmitting power of the mobile station and (b) make a handover decision on the basis of (b1) a combination of measurement results of two or more time slots assigned to the mobile station, and (b2) a measurement result of the poorest time slot in relation to the at least one characteristic.

9. An arrangement as claimed in claim 8, wherein:

the mobile station has a parallel control channel common to all the time slots assigned to the mobile station; and the mobile station is arranged to transmit a combination of measurement results of all the time slots assigned to the mobile station from the mobile station to the fixed radio network through the common, parallel control channel.

10. An arrangement as claimed in claim 9, wherein:

the fixed radio network is arranged to control the transmitting power of the mobile station in all the time slots assigned to the mobile station, through the common, parallel control channel.

11. An arrangement as claimed in claim 8, wherein:

the mobile station has a dedicated, parallel control channel for each of the time slots assigned to the mobile station; and the mobile station is arranged to separately transmit a combination of the measurement results of all the time slots assigned to the mobile station to a fixed radio network through the parallel control channel corresponding to each respective the time slot.

12. An arrangement as claim in claim 11, wherein:

the fixed network is arranged to control the transmitting power of the mobile station in each time slot assigned to the mobile station, through the parallel control channel corresponding to each respective the time slot.

13. An arrangement as claimed in claim 11, wherein:

the fixed network is arranged to control the transmitting power of the mobile station in all the time slots assigned to the mobile station, through one parallel control channel.

* * * * *